(12) United States Patent
Patterson et al.

(10) Patent No.: US 11,738,293 B2
(45) Date of Patent: Aug. 29, 2023

(54) FLUID FILTERING APPARATUS AND METHOD

(71) Applicant: Albert Patterson, West Lorne (CA)

(72) Inventors: Albert Patterson, West Lorne (CA); Tyler Clark, Dutton (CA)

(*) Notice: Subject to any disclaimer, the term of this patent is extended or adjusted under 35 U.S.C. 154(b) by 156 days.

(21) Appl. No.: 17/367,539

(22) Filed: Jul. 5, 2021

(65) Prior Publication Data

US 2022/0008842 A1 Jan. 13, 2022

Related U.S. Application Data

(60) Provisional application No. 63/049,874, filed on Jul. 9, 2020.

(51) Int. Cl.
| | | |
|---|---|---|
| *B01D 24/32* | (2006.01) | |
| *B01D 24/00* | (2006.01) | |
| *B01D 35/30* | (2006.01) | |
| *B01D 24/46* | (2006.01) | |
| *B01D 39/06* | (2006.01) | |
| *C02F 1/00* | (2023.01) | |
| *C02F 103/10* | (2006.01) | |

(52) U.S. Cl.
CPC ........... *B01D 24/32* (2013.01); *B01D 24/008* (2013.01); *B01D 24/4631* (2013.01); *B01D 35/30* (2013.01); *B01D 39/06* (2013.01); *C02F 1/001* (2013.01); *B01D 2101/04* (2013.01); *B01D 2201/0415* (2013.01); *B01D 2201/302* (2013.01); *C02F 2103/10* (2013.01); *C02F 2201/006* (2013.01); *C02F 2303/16* (2013.01)

(58) Field of Classification Search
CPC .. B01D 24/32; B01D 24/008; B01D 24/4631; B01D 35/30; B01D 39/06; B01D 2101/04; B01D 2201/0415; B01D 2201/302; B01D 2239/0654; B01D 33/23; B01D 33/35; B01D 33/48; B01D 39/2003; B01D 39/2034; C02F 1/001; C02F 2103/10; C02F 2201/006; C02F 2303/16; C02F 1/76
USPC ....... 210/786, 224, 226, 231, 232, 230, 252, 210/253, 255, 314, 335–337, 346, 459, 210/455, 461, 486, 108, 275, 284, 333.1, 210/427
See application file for complete search history.

(56) References Cited

U.S. PATENT DOCUMENTS

| | | |
|---|---|---|
| 2,243,585 A | 5/1941 | Fowler |
| 4,210,539 A | 7/1980 | Shiban |
| 6,231,761 B1 * | 5/2001 | Mohlin ................. B01D 33/23 210/232 |

(Continued)

*Primary Examiner* — Madeline Gonzalez
(74) *Attorney, Agent, or Firm* — Bereskin & Parr LLP

(57) ABSTRACT

A rotary fluid filter including a filter body rotationally mounted within a housing. The housing having a front cap having a main fluid inlet and a backwash outlet, a rear cap having a main fluid outlet and a backwash inlet. The filter body having a front face, a rear face, and a plurality of fluid flow passages each extending through the filter body between the front face and the rear face and having a filter received in each fluid flow passage. The filter body operable to rotate with in the housing such that, for each fluid flow passage, as it is aligned with the main fluid inlet a main fluid is received therein, as it is aligned with the main fluid outlet the main fluid is discharged therefrom, and as it is aligned with the backwash inlet and the backwash outlet a backwash fluid is received therethrough.

19 Claims, 9 Drawing Sheets

(56) References Cited

U.S. PATENT DOCUMENTS

| | | |
|---|---|---|
| 6,336,561 B1 | 1/2002 | Kossik et al. |
| 8,985,980 B2 | 3/2015 | Patterson et al. |
| 2003/0099553 A1 | 5/2003 | Hosford |
| 2018/0116188 A1 | 5/2018 | Lindner |
| 2018/0326357 A1 | 11/2018 | Vanttinen et al. |

* cited by examiner

FLUID FILTERING APPARATUS AND METHOD

CROSS-REFERENCE

The present application claims benefit of U.S. Provisional Patent Application No. 63/049,874 entitled FLUID FILTERING APPARATUS AND METHOD, filed Jul. 9, 2020, the entirety of which is incorporated herein by reference.

TECHNICAL FIELD

The disclosure relates to fluid filtering, and in particular, to a rotary fluid filter.

BACKGROUND

Fluids are used in many applications, and often fluid purity is an important consideration. Often, fluids are filtered prior to use to remove impurities. For example, water may be filtered prior to drinking, and mining tailings may be filtered prior to release.

Many fluids are filtered by being passed through a membrane or mesh strainer. In some cases, the membrane or mesh strainer is carried by a rotationally mounted body. A fluid may be filtered by passing through the membrane or mesh strainer of the rotationally mounted body as the rotationally mounted body rotates.

U.S. Pat. No. 6,231,761 to Mohlin et al. ("Mohlin") discloses a rotary disk filter comprising a rotatable drum and at least one disk-shaped filter member, which on the outside of the drum extends outwards in the transverse direction of the drum. The filter member has a filter support unit and a filter portion supported thereby. A liquid duct extends from the drum through the filter member and out through the filter portion. The filter portion is formed of at least one filter segment which comprises a filter frame and a filter cloth expanded by the frame. The filter segment is detachably secured to the filter support unit.

U.S. Pat. No. 6,336,561 to Kossik et al. ("Kossik") discloses a disposable rotary drum filter for processing batches of slurry. The device includes an outer housing in which is disposed a rotatable inner drum that is covered with a filter material. The inner drum rotates through a slurry. The filtrate outlet is connected to a vacuum source that draws the slurry through the filter material. Solids in the slurry are thus deposited as a filter cake on the outer surface of the filter material, while liquid from the slurry passes through the filter material to be collected as a filtrate. Air drawn into the housing through an inlet passes through the filter material and partially dries the filter cake that has been rotated out of the slurry. As the inner drum rotates, an edge formed on the housing scrapes away a portion of the filter cake, which falls into a filter cake receiver. A simple overflow outlet level limits the slurry level to a defined maximum, and an orifice formed in a fixed plate disposed in a cavity at one end of the inner drum controls pressure conditions within the device to ensure optimal fluid flow.

United States Patent App. Pub. No. 2003 0099553A1 to Hosford ("Hosford") discloses a combined pump and filter assembly having backwashing apparatus for the filter assembly and apparatus for offsetting the tendency for an increase in pump output flow resistance.

U.S. Pat. No. 2,243,585 to Towler et al. ("Towler") discloses a rotary self-cleaning strainer having a rotor which is mounted to rotate within and relatively to a casing, said rotor consisting of two intercommunicating sections, one section functioning both as a strainer and a pump and the other section solely as a pump. The arrangement being such that during each revolution of the rotor liquid in excess is induced to enter the strainer section for straining, from whence it is pumped into the other or pump section which functions to pump some of said liquid through a discharge outlet in the casing and the excess liquid back through the strainer section for the purpose of cleaning its strainer element and out through a further outlet in the casing for discharge.

However, rotationally mounted filters of the prior art may be inefficient or ineffective. Accordingly, there is a need for an improved rotary fluid filter.

SUMMARY

According to a first aspect, there is provided a rotary fluid filter, comprising a housing comprising a front cap having a main fluid inlet located at a first rotation position and a backwash outlet located at a fourth rotation position, a rear cap having a main fluid outlet located at a second rotation position and a backwash inlet located at the fourth rotation position, and a side wall connecting the front cap to the rear cap; and a filter body rotationally mounted within the housing for rotation about a rotational axis, the filter body operable to be rotated in a rotation direction within the housing through a 360 degree filtration cycle, the filter body comprising a filter support having a front face and a rear face opposite the front face, the filter support being configured to have a plurality of discrete fluid flow passages each extending between a first end at the first radial distance from the rotational axis in the front face and a second end at the first radial distance from the rotational axis in the rear face, wherein the filter body includes a plurality of filters supported by the filter body, at least one filter of the plurality of filters received in each fluid flow passage of the plurality of fluid flow passages, and wherein the first, second, and fourth rotation positions are each spaced the first radial distance from the rotational axis, the second rotation position is spaced from the first rotation position by a first angular spacing about the rotational axis in the rotation direction, and the fourth rotation position is spaced from the second rotation position by a second angular spacing about the rotational axis in the rotation direction, the sum of the first angular spacing and the second angular spacing being less than 360 degrees.

In some examples, the plurality of filters includes a plurality of beds of granular filter media.

For each fluid flow passage of the plurality of fluid flow passages the backwash fluid may be received from the backwash inlet unevenly across the rear end to stir up the at least one filter.

The backwash inlet may include a slot-shaped inlet.

For each fluid flow passage of the plurality of fluid flow passages at least two porous walls may extend across the fluid flow passage to define at least one media chamber therebetween to hold the at least one filter in the fluid flow passage, the at least one filter including a bed of loose granular filter media.

The bed of loose granular filter media may include sand.

Each fluid flow passage of the plurality of fluid flow passages may extend through a plurality of aligned removable filter cartridges.

Each filter cartridge of the plurality of aligned removable filter cartridges may include a pocket having a flow axis extending between a set of side walls and having at least one porous end wall extending across the flow axis to inhibit the movement of granular material along the flow axis.

The pocket of the filter cartridge of the plurality of aligned removable filter cartridges at the front end may be provided as an empty pocket and the pocket of each other of the plurality of aligned removable filter cartridges may include a bed of loose granular filter media.

The filter body may be formed of a plurality of axially aligned filter support layers, and each filter cartridge of the plurality of aligned removable filter cartridges may be removably held by a cartridge holder included in a filter support layer of the plurality of axially aligned filter support layers, and the plurality of axially aligned filter support layers may be separable to provide access to the plurality of aligned removable filter cartridges.

The front cap may include an air inlet at a third rotation position and the rear cap may include an air outlet at the third rotation position, the third rotation position may be spaced the first radial distance from the rotational axis and may be spaced from the second rotation position by a third angular spacing about the rotational axis in the rotation direction, the third angular spacing being less than the second angular spacing.

The plurality of fluid flow passages may be evenly angularly spaced about the rotational axis.

The main fluid may include water and the backwash fluid may include a gas.

Each fluid flow passage may be a linear passage.

In some examples, as the filter body is rotated within the housing in the rotation direction through the filtration cycle and a main fluid is drawn through the main fluid inlet and a backwash fluid is pumped into the backwash inlet, for each fluid flow passage as the fluid flow passage is aligned with the first rotation position, the main fluid is received from the main fluid inlet, as the filter body continues to rotate in the first rotation direction, the fluid flow passage moves from the first rotation position to the second rotation position, the main fluid passes through the fluid flow passage and is filtered by the filter received in the fluid flow passage, and as the fluid flow passage is aligned with the second rotation position, the fluid is substantially discharged through the main fluid outlet, and as the filter body continues to rotate in the first rotation direction, the fluid flow passage is aligned with the fourth rotation position and backwash fluid is received from the backwash inlet and is discharged through the backwash outlet.

The front cap may include an air inlet at a third rotation position and the rear cap may include an air outlet at the third rotation position, the third rotation position may be spaced the first radial distance from the rotational axis and may be spaced from the second rotation position by a third angular spacing about the rotational axis in the rotation direction, the third angular spacing being less than the second angular spacing, and as the filter body is rotated within the housing in the rotation direction through the filtration cycle and the main fluid is drawn through the main fluid inlet and the backwash fluid is pumped into the backwash fluid inlet, for each fluid flow passage as the filter body continues to rotate from being aligned with the second rotation position to being aligned with the fourth rotation position the fluid flow passage may be aligned with the third rotation position and air may be received from the air inlet and may be discharged through the air outlet.

According to a second aspect, there is provided a method of filtering a main fluid using a rotary fluid filter, comprising initiating a 360 degree filtration cycle by receiving a first portion of a main fluid at a front end of a first fluid flow passage extending through a filter body rotationally mounted within a housing, the filter body aligned with a first rotation position of the housing; rotating the filter body in a rotation direction about a rotational axis to align the filter body with a second rotation position of the housing; discharging, in the second rotation position, the first portion of the main fluid from a rear end of the first fluid flow passage, the rear end opposite the front end and the first portion of the main fluid having passed through a filter received in the first fluid flow passage; rotating, the filter body in the rotation direction about a rotational axis of the filter body to align the filter body with a third rotation position; receiving, in the third rotation position, a first portion of air through the first fluid flow passage; rotating the filter body in the rotation direction about the rotational axis to align the filter body with a fourth rotation position of the housing; receiving, in the fourth rotation position, a first portion of a backwash fluid through the first fluid flow passage from the rear end to the front end; completing the rotational cycle by rotating the filter body in the first rotation direction back to alignment with the first rotation position.

In some examples, the filter body includes a second fluid flow passage extending therethrough separate from the first fluid flow passage, and the method further comprises, between initiating the rotational cycle and completing the rotational cycle, receiving a second portion of the main fluid at a front end of the second fluid flow passage.

The housing may have a main fluid inlet, and the first portion of the main fluid may be received at the front end of the first fluid flow passage from the main fluid inlet and the second portion of the main fluid is also received at the front end of the second fluid flow passage from the main fluid inlet.

According to a third aspect, there is provided a fluid pumping system, comprising the rotary fluid filter and a pumping apparatus operable to simultaneously pump a main fluid through a first pump conduit and a backwash fluid through a second pump conduit, the first pump conduit fluidly coupled to one of the main fluid inlet or the main fluid outlet for the main fluid to be pumped therethrough, and the second pump conduit fluidly coupled to one of the backwash inlet and the backwash outlet for the backwash fluid to be pumped therethrough.

In some examples, the pumping apparatus is a rotary pump.

The front cap may include an air inlet at a third rotation position and the rear cap may include an air outlet at the third rotation position.

BRIEF DESCRIPTION OF THE DRAWINGS

The drawings included herewith are for illustrating various examples of systems, methods, and apparatus of the present specification. In the drawings.

DETAILED DESCRIPTION

Various apparatus or processes will be described below to provide an example of each claimed embodiment. No example described below limits any claimed embodiment and any claimed embodiment may cover processes or apparatuses that differ from those described below. The claimed embodiments are not limited to apparatuses or processes having all of the features of any one apparatus or process described below or to features common to multiple or all of the apparatus or processes described below.

Figure 2:
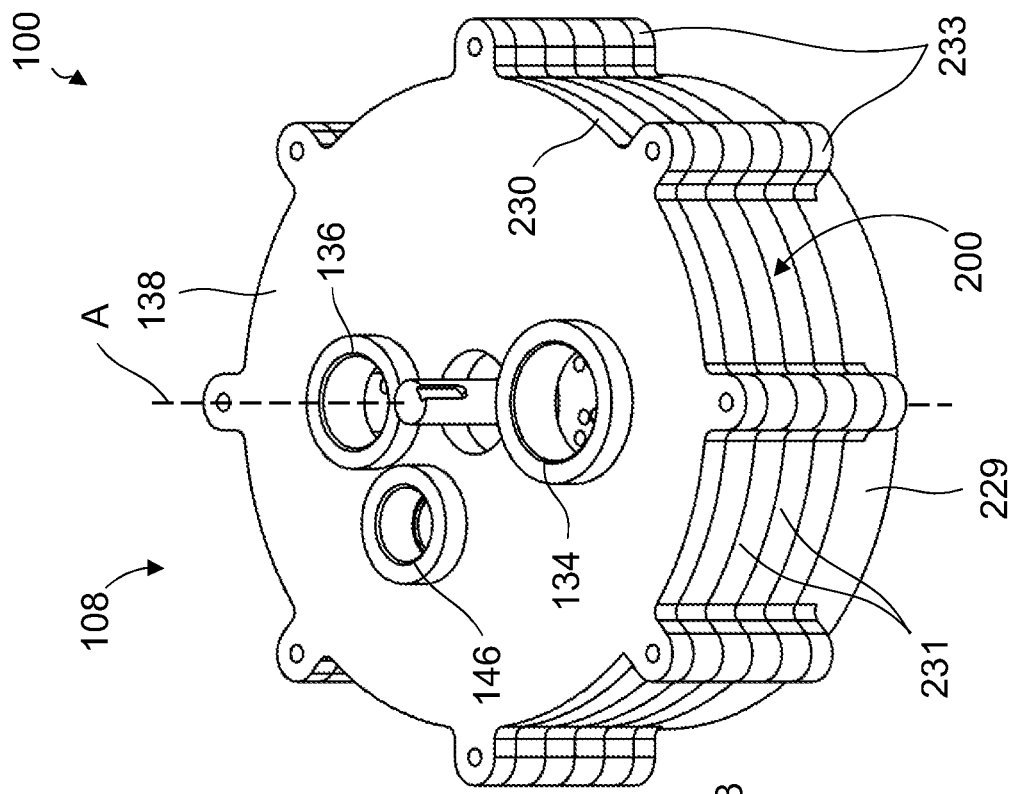
FIG. 2 is a rear perspective view of the rotary fluid filter of FIG. 1.
Figure 1:
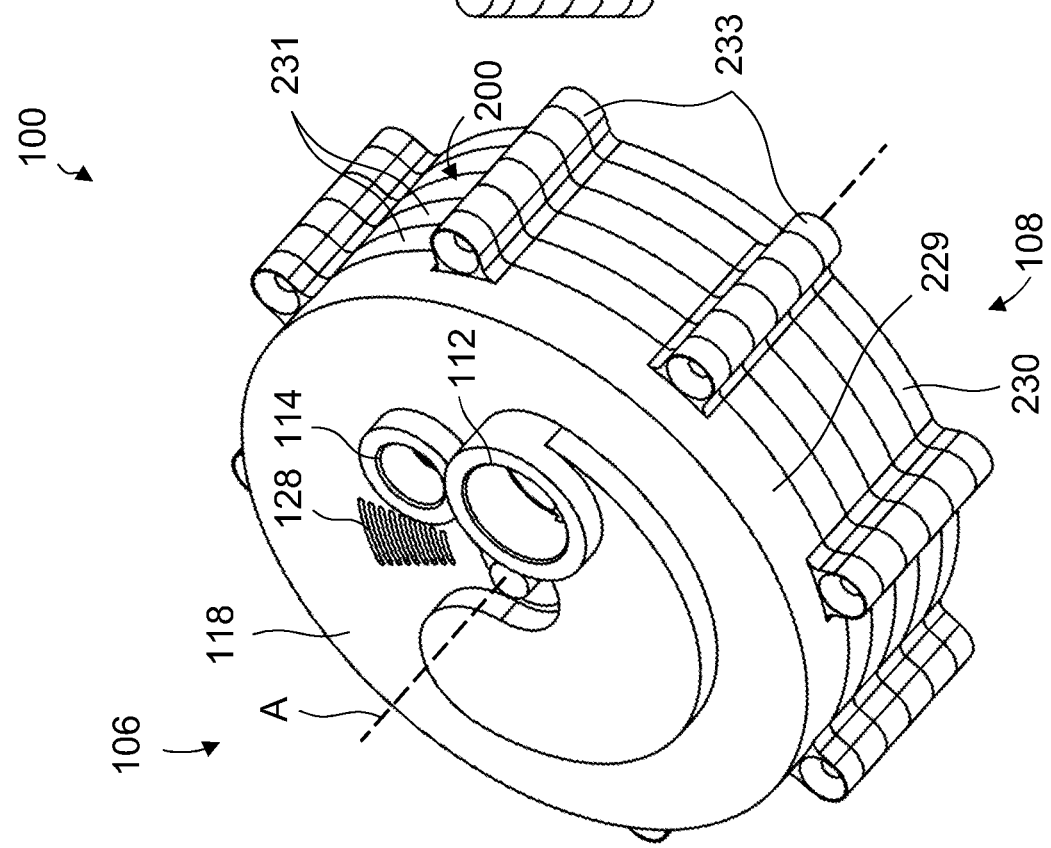
FIG. 1 is a front perspective view of a rotary fluid filter.

Referring now to FIGS. 1 and 2, illustrated therein is an example of a rotary fluid filter 100. The rotary fluid filter 100 includes at least one filter mounted on a rotational body such that the filter can be carried through a 360 degree rotational filtration cycle during which the filter is used to purify a main fluid and then backwashed by a backwash fluid to regenerate the filter. Regenerating the filter may allow a smaller filter to be used effectively and/or allow the filter to be used for a longer period of time. Optionally, the filter may be dried prior to backwashing.

The main fluid may be, for example, water, such as drinking water. The rotary fluid filter 100 may remove contaminants from the water. Optionally, a cleansing agent such as chlorine may be added to the water upstream of the rotary fluid filter 100 to kill microorganisms in the water, and the rotary fluid filter 100 may then be used to remove debris and/or the cleansing agent. In some examples, the rotary fluid filter 100 may be portable, such as sized to fit within a knapsack.

In another example, the rotary fluid filter 100 may be used to filter mining tailings to remove contaminants from a fluid prior to discharging the fluid, such as to avoid the need for tailings ponds to allow contaminants to settle. In some examples, the rotary fluid filter 100 may be large, such as to handle the output of an industrial facility or city.

The rotary fluid filter 100 includes a housing 102 and has a rotational axis A, a front end 106, and a rear end 108. The housing 102 may be formed of a rigid material, such as a metal or plastic.

As in the illustrated example, the housing 102 may include a front cap 229, a rear cap 230, and a side wall 200 made up of a set of annular side wall portions 231. The set of annular wall portions 231 spaces the front cap 229 from the rear cap 230, and forms a chamber therebetween. In the illustrated example, portions of the housing (e.g., caps 229, 230 and annular wall portions 231) are connected to one another by mechanical fasteners, such as by screws passed through mounting projections 233 on the housing portions.

Figure 3:
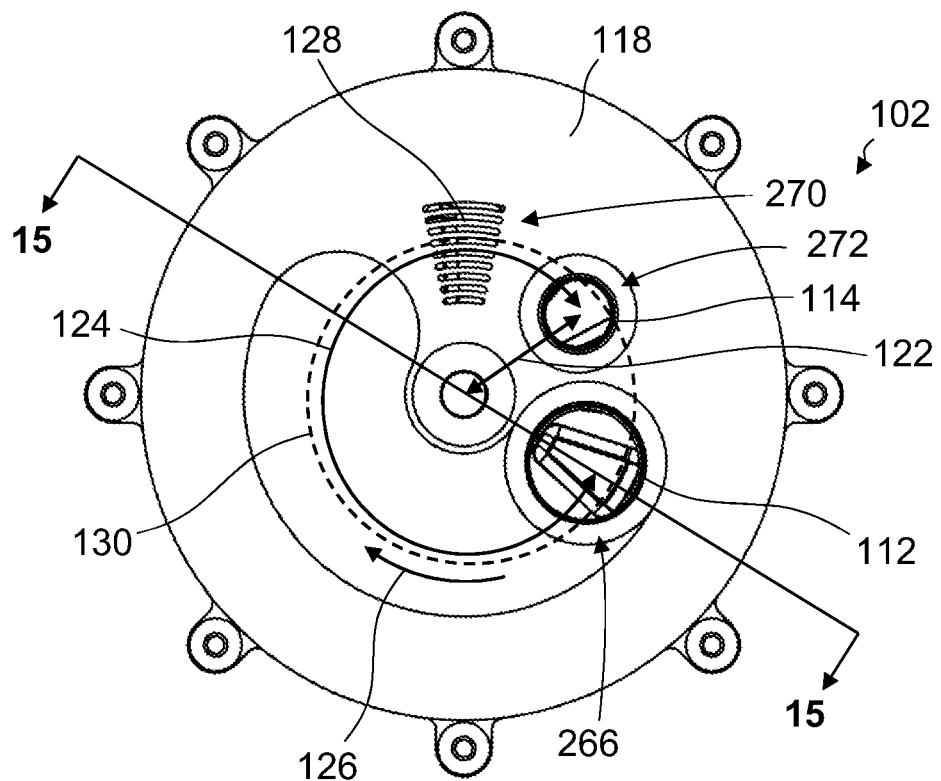
FIG. 3 is a front view of the rotary fluid filter of FIG. 1.

Referring now to FIG. 3, in the illustrated example a main fluid inlet 112 and a backwash outlet 114 are both in the housing front face 118 of the front cap 229 of the housing 102. Accordingly, a main fluid may flow into the housing 102 through the housing front face 118 and a backwash fluid may flow out of the housing 102 through the housing front face 118, as described further elsewhere herein.

The main fluid inlet 112 and the backwash outlet 114 each include a passage through the front cap 229, preferably a linear passage extending parallel to the rotational axis A. Each of the main fluid inlet 112 and the backwash outlet 114 may include a single opening or port to an exterior of the rotary fluid filter 100 and/or a single opening or port to an interior chamber of the housing 102. A single port may facilitate use with a conduit leading from the port, such as an exterior hose leading from the main fluid inlet 112 to an exterior pump or reservoir, or a passage formed in a rotationally mounted body that is received in an interior chamber of the housing 102. The main fluid inlet 112 may include a manifold to facilitate fluid transfer, as described elsewhere herein. A manifold may include more than one opening or port to the interior chamber 182 of the housing 102.

As in the illustrated example, the main fluid inlet 112 and the backwash outlet 114 may be at the same first radial distance 122 from the longitudinal axis A. This may facilitate use with the rotationally mounted body received in the housing 102. Also as in the illustrated example, the main fluid inlet 112 and the backwash outlet 114 may be angularly spaced from one another by a first angular spacing 124 around the rotational axis A along a first rotation direction 126 from the main fluid inlet 112. The first angular spacing 124 may be greater than 180 degrees. The first angular spacing 124 may allow for the main fluid to enter from a passage (e.g., passage 158 discussed below) extending through a body rotationally mounted in the housing 102 (e.g., filter body 150 discussed below) and then be discharged from the passage out though the opposite side of the housing 102 prior to the passage being aligned with the backwash outlet 114 as the rotationally mounted body rotates within the housing 102 in the first rotation direction 126.

In some examples, the illustrated housing 102 also includes an optional drying air inlet 128. Air inlet 128 may be provided for a stream of air to move through a passage to dry a filer located in the passage. As shown, the air inlet 128 is also in the housing front face 118 along with the main fluid inlet 112 and the backwash outlet 114. Accordingly, air may also flow into the housing 102 through the housing front face 118.

The air inlet 128 is angularly spaced from the main fluid inlet 112 and the backwash outlet 114. The air inlet 128 may also be at the first radial distance 122 from the longitudinal axis A, which may facilitate use with the rotationally mounted body received in the housing. As in the illustrated example, the air inlet 128 may be midway along the first angular spacing 124. An air inlet 128 between the main fluid inlet 112 and the backwash outlet 114 may permit the air to pass into the housing 102 at a point where it will pass through the passage in the rotationally mounted body (i.e., filter body 150) to dry a filter received in the passage after the main fluid and before the backwash fluid. Where the rotary fluid filter 100 includes a manifold connected to the main fluid inlet, the air inlet 128 may be spaced from the manifold along a rotational path 130 of the rotationally mounted body.

The air inlet 128 is a passage through the front cap 229, preferably a linear passage extending parallel to the rotational axis A. The air inlet 128 may include a single opening or port to the exterior of the rotary fluid filter 100 and/or a single opening or port to the interior chamber 182 of the housing 102. Optionally, such as if the air inlet 128 may draw in environmental air, the air inlet 128 may include a grating or set of openings to the exterior of the rotary fluid filter 100, as in the illustrated example.

Figure 4:
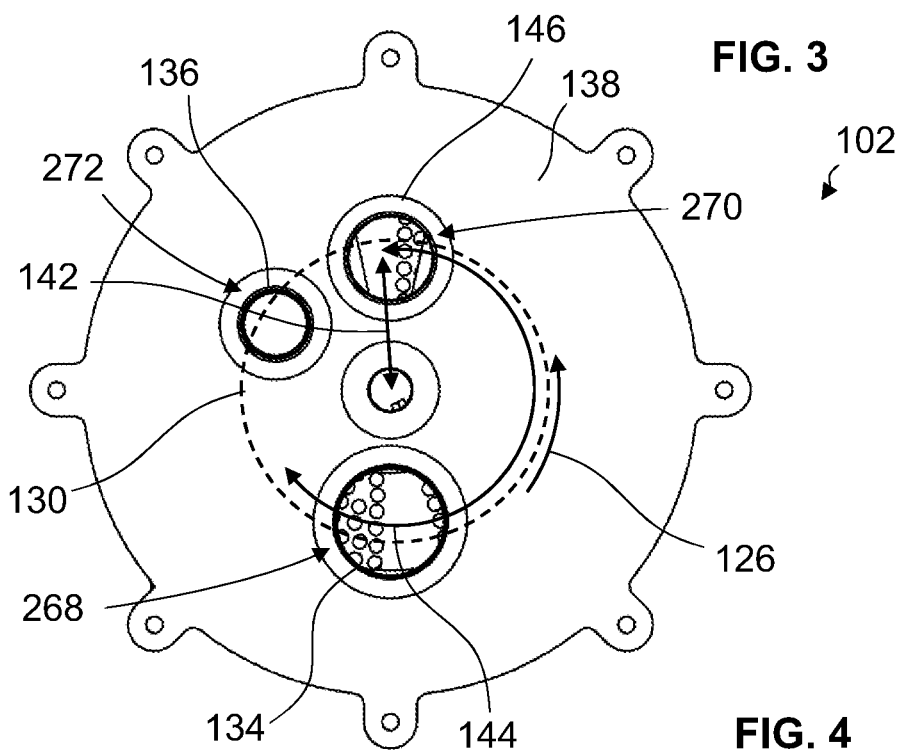
FIG. 4 is a rear view of the rotary fluid filter of FIG. 1.

Referring now to FIG. 4, in the illustrated example a main fluid outlet 134 and a backwash inlet 136 are both in the housing rear face 138 of the rear cap 230 of the housing 102, the rearward face 138 opposite the forward face 118.

Accordingly, a main fluid, such as drinking water that needs to be filtered before consumption, may flow out of the housing 102 through the housing rear face 138 (e.g., through the main fluid outlet 134 in the illustrated example) and a backwash fluid may flow into the housing 102 through the housing rear face 138 (e.g., through the backwash inlet 136 in the illustrated example). The main fluid (e.g., the water to be consumed by an individual) may be filtered by moving through the passage extending through the rotationally mounted body and through at least one filter received in the passage. The backwash fluid may be used to backwash and thereby regenerate the at least one filter received in the passage, such as by stirring up the at least one filter and/or flushing debris out of the at least one filter. In some examples, the main fluid is and/or includes water and the backwash fluid is and/or includes a gas such as compressed air.

Figure 8:
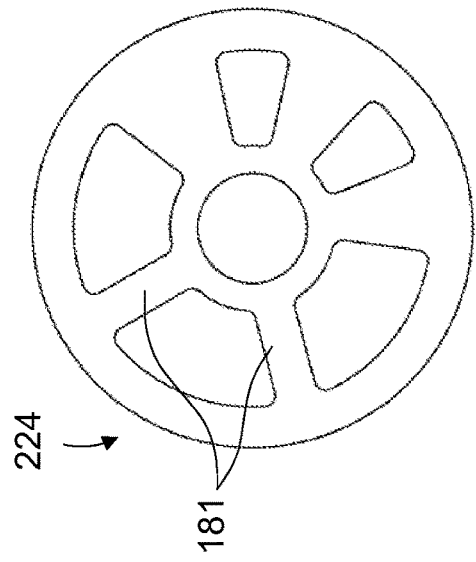
FIG. 8 is a front view of the front face seal of FIG. 7.
Figure 7:
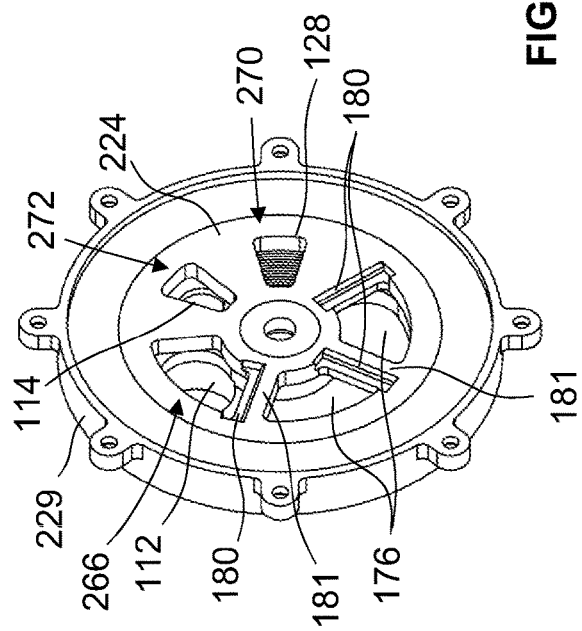
FIG. 7 is a rear perspective view of a front face seal received in the front cap of FIG. 5.
Figure 9:
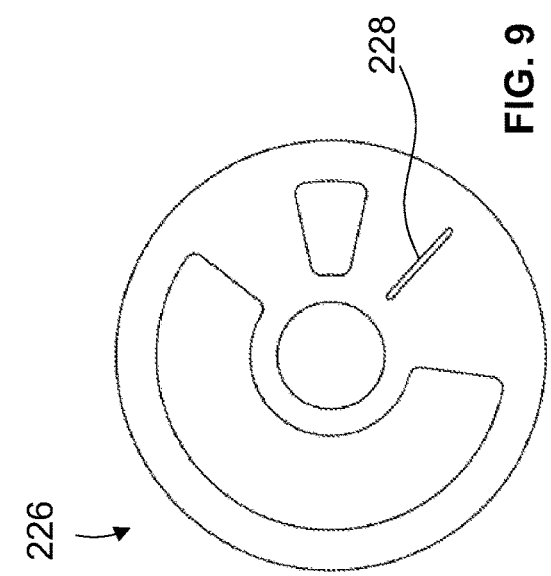
FIG. 9 is a rear view of a rear face seal.

The main fluid outlet 134 and the backwash inlet 136 are passages through the rear cap 230, preferably linear passages extending parallel to the rotational axis A. Each of the main fluid outlet 134 and the backwash inlet 136 may include a single opening or port to the exterior of the rotary fluid filter 100 and/or a single opening or port to the interior chamber 182 of the housing 102. A single port may facilitate use with a conduit leading from the port, such as an exterior hose leading from an exterior port of the main fluid outlet 134 to an exterior pump or reservoir. The main fluid outlet 134 may include a manifold to facilitate fluid transfer, as described elsewhere herein. A manifold may optionally include more than one opening or port to the interior chamber of the housing. For example, a manifold may include a plurality of openings separated by cross bars which are provided to support wipers (e.g., cross bars 181 supporting wipers 180 of FIGS. 7 and 8), as discussed further below.

As in the illustrated example, the main fluid outlet 134 and the backwash inlet 136 are at the same second radial distance 142 from the longitudinal axis A. This spacing may facilitate use with the rotationally mounted body. In the illustrated example, the second radial distance 142 is the same as the first radial distance 122.

Also as in the illustrated example, the main fluid outlet 134 and the backwash inlet 136 may be angularly spaced from one another by a second angular spacing 144 along the first rotation direction 126 from the main fluid outlet 134. The second angular spacing 144 may be greater than 180 degrees. The second angular spacing 144 may allow for the main fluid to be discharged from the passage extending through the rotationally mounted body prior to the passage arriving at the backwash inlet 136 as the rotationally mounted body rotates within the housing 102 in the first rotation direction 126.

The main fluid outlet 134 may be rotationally disaligned with the main fluid inlet 112, and may be further along the first rotation direction 126 from the main fluid inlet 112. Rotational disalignment may facilitate movement of the main fluid through the rotationally mounted body. For example, the rotationally mounted body may be moving continuously in the first rotation direction 126, and the main fluid may come out of the opposite end of the passage that is extending through the rotationally mounted body further along a rotational path 130 of the rotationally mounted body. In some examples, one or more manifolds connected to the main fluid inlet 112 and/or main fluid outlet 134 may facilitate introducing the main fluid into the passage and/or collecting the main fluid from the passage. Accordingly, the second angular spacing 144 may be smaller than the first angular spacing 124.

The backwash inlet 136 may be axially aligned with the backwash outlet 114, which may facilitate directing a flow of the backwash fluid through the passage 158 extending through the rotationally mounted body. The backwash fluid may be directed through the passage at a high rate of speed, and may come out of the passage at substantially the same point along the rotational path 130 as it entered.

In the illustrated example, the housing 102 also includes the optional drying air outlet 146. Optionally, the air outlet 146 is also in the housing rear face 138 along with the main fluid outlet 134 and the backwash inlet 136. Accordingly, air flows through the filer in the passage and out of the housing 102 through the housing rear face 138.

The air outlet 146 is spaced from the main fluid outlet 134 and the backwash inlet 136. The air outlet 146 may also be at the second radial distance 142 from the longitudinal axis A, which may facilitate use with the rotationally mounted body received in the housing 102. As in the illustrated example, the air outlet 146 may be midway along the second angular spacing 144 to permit the air to pass into the passage of the rotationally mounted body prior to the passage and dry the filter in the passage before arriving at the backwash inlet 136. Where the rotary fluid filter 100 includes a manifold connected to the main fluid outlet 134, the air outlet 146 may be spaced from the manifold along the rotational path 130.

The air outlet 146 is a passage through the rear cap 230, preferably a linear passage extending parallel to the rotational axis A. The air outlet 146 may also include a single opening or port to the exterior of the rotary fluid filter 100 and/or a single opening or port to the interior chamber of the housing 102. The air outlet 146 may be axially aligned with the air inlet 128, since the air may also be directed through the rotary fluid filter 100 at a high rate of speed.

Figure 5:
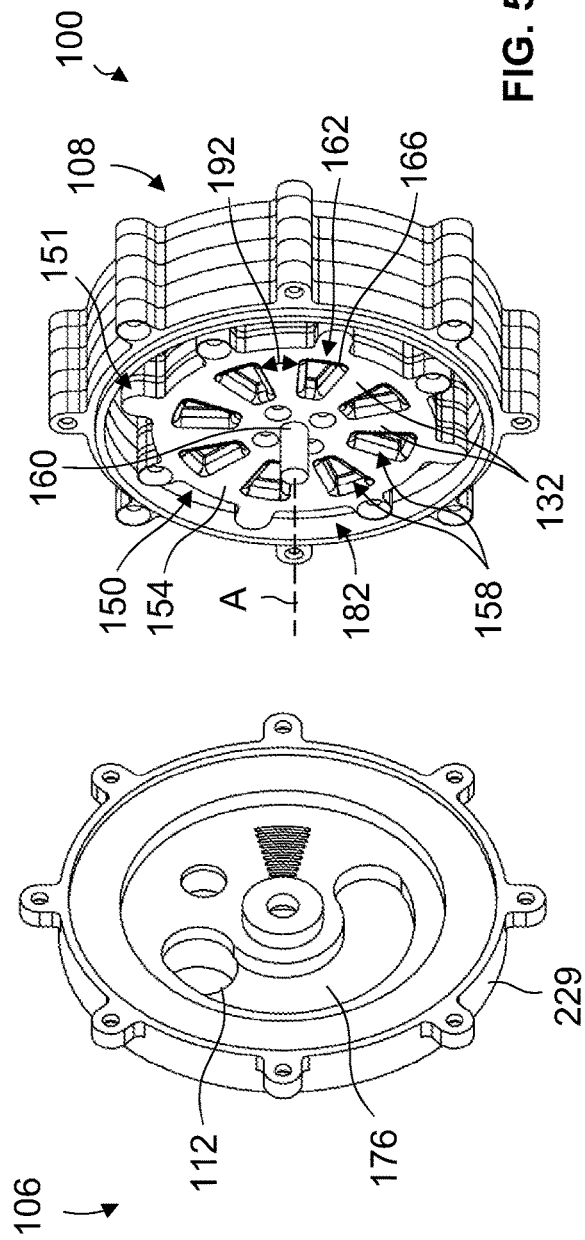
FIG. 5 is a front perspective view of the rotary fluid filter of FIG. 1 with a front cap detached.
Figure 6:
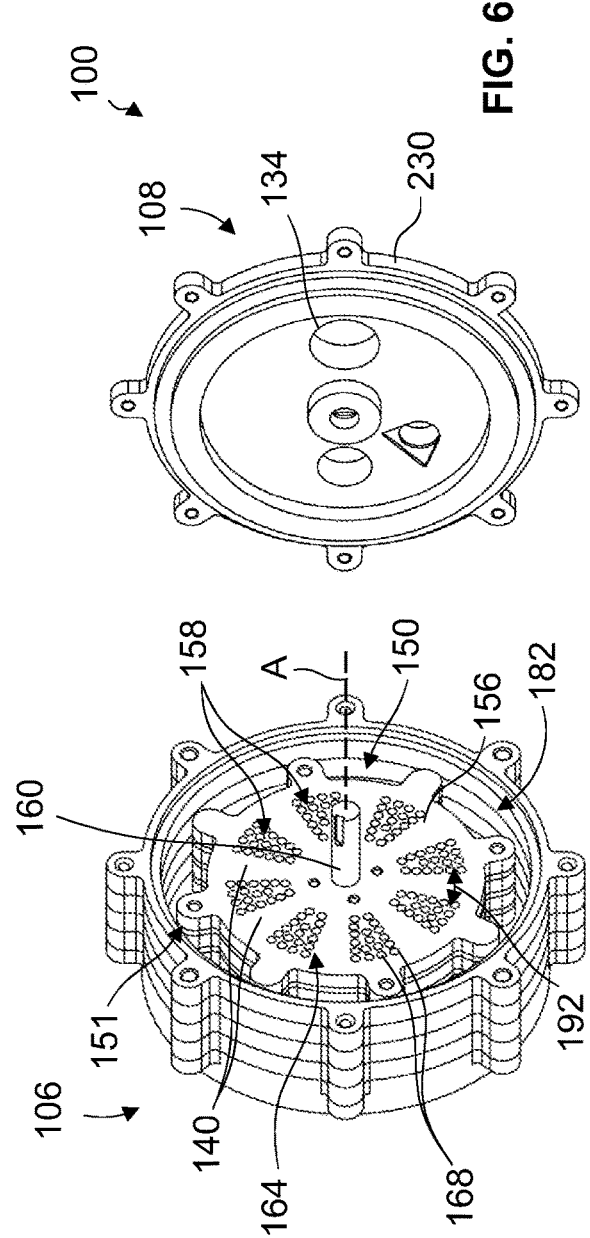
FIG. 6 is a rear perspective view of the rotary fluid filter of FIG. 1 with a rear cap detached.
Figure 11:
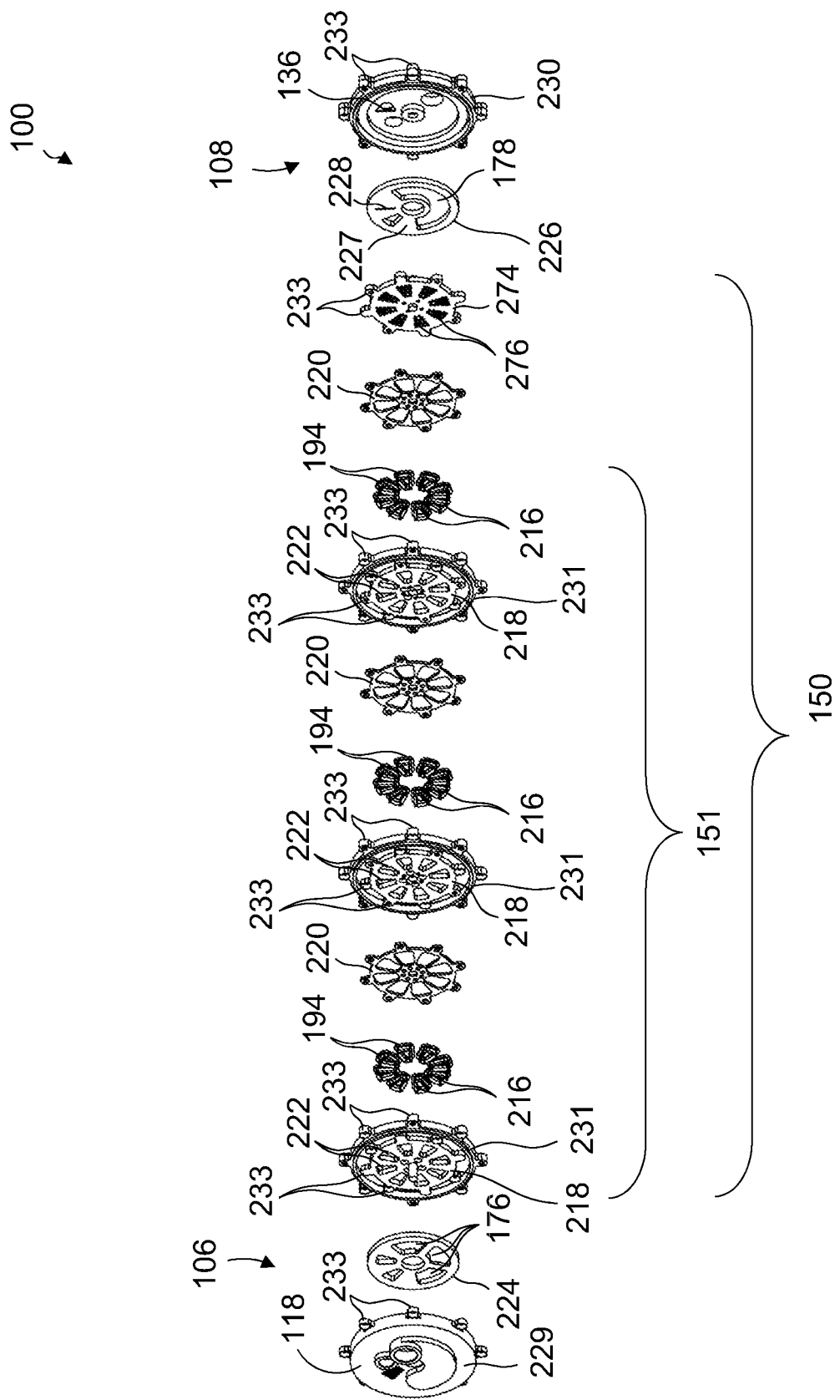
FIG. 11 is an exploded view of the rotary fluid filter of FIG. 1.

Referring now to FIGS. 5 and 6 illustrated is the rotary fluid filter 100 with the front cap 229 removed (FIG. 5) and the rear cap removed (FIG. 6). As in the illustrated example, the rotary fluid filter 100 may include a filter body 150 (i.e., the rotationally mounted body) comprising a filter support 151 comprising a plurality of filter support layers 218 (FIG. 11). The filter body 150 is rotationally mounted within the internal chamber 182 of the housing 102. The illustrated internal chamber 182 is formed by the front cap 229, the rear cap 230, and the set of annular wall portions 231. The filter body 150 is configured to hold one or more filters, as described further below. The filter body 150 may be formed of a rigid material, such as a metal or plastic.

The filter body 150 includes a drive shaft 160 for rotating the filter body 150 within the housing 102 about the rotational axis A. The drive shaft 160 extends through at least one of the front cap 229 and the rear cap 230 (see also FIGS. 1 and 2) to be driven from outside the housing 102. The filter body 150 has a body front face 154 and a body rear face 156 opposite the body front face 154. As in the illustrated example, the filter body 150 may be a disk-shaped body.

As in the illustrated example, the body front face 154 is adjacent the front cap 229 and a housing front face 118 (FIG. 1), and the body rear face 156 is adjacent the rear cap 230 and a housing rear face 138 (FIG. 2). Accordingly, an opening in the body front face 154 is alignable with an opening in the housing front face 118 and/or an opening in the front cap 229, and similarly an opening in the body rear face 156 is alignable with an opening in the housing rear face 138 and/or an opening in the rear cap 230.

The filter body 150 is configured to provide a plurality of fluid flow passages 158 (e.g., discrete passages) extending through the filter body 150. Each fluid flow passage 158 may be separate from each other fluid flow passage 158. A passage structure for the movement of fluid through the filter body 150 may facilitate using one passage to filter while regenerating and/or drying one or more other passages. A passage structure may also facilitate using a pump to draw fluid through the rotary fluid filter 100 by providing a closed path through which a pump is able to draw a fluid from a downstream end.

Each fluid flow passage 158 may extend between a front end 162 at the body front face 154 and a rear end 164 at the body rear face 156. Extending a passage between the body front face 154 and the body axial rearward face 156 of the filter body may allow for a greater degree of filtration than extending the passage to and/or from a radially outward face of the filter body 150. Extending a passage between the body front face 154 and the body axial rearward face 156 of the filter body 150 may also allow for a reduction in the dimensions of the filter body 150 and/or a reduction in the dimensions of the rotary fluid filter 100.

As in the illustrated example, the front end 162 of fluid flow passage 158 may include a first end opening or port 166, which may be a single first end opening or port 166. The rear end 164 may include a second end opening or port 168. The second end opening or port 168 may be a single opening, or, as in the illustrated example, a plurality of openings 168 in close proximity formed by a porous wall, as described further below. Each fluid flow passage 158 may optionally be a linear passage. Each fluid flow passage 158 may optionally extend parallel to the rotational axis A. The plurality of fluid flow passages 158 may be angularly spaced about the rotational axis A.

Each front end 162 may be spaced from each other front end 162 by solid portions 132 of the filter support 151. Similarly, each rear end 164 may be spaced from each other rear end 164 by solid portions 140 of the filter support 151. As in the illustrated example, the front ends 162 may be angularly spaced from one another and at the first radial distance 122 from the longitudinal axis A. The rear ends 164 may also be angularly spaced from one another and at the first radial distance from the longitudinal axis A. The plurality of fluid flow passages 158 may be linear and angularly spaced by a passage spacing 192.

Figure 10:
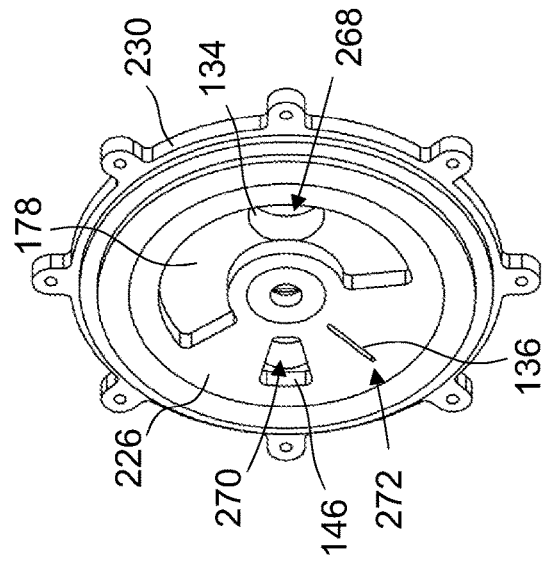
FIG. 10 is a front perspective view of the rear face seal of FIG. 9 received in the rear cap of FIG. 6.

As in the illustrated example, the main fluid inlet 112 may include a main inlet manifold 176 (FIGS. 5 and 7) to facilitate transfer of the main fluid from the main fluid inlet 112 to the front end 162 of a selected number of fluid flow passages 158 at a time. Similarly, the main fluid outlet 134 may include a main outlet manifold 178 (FIG. 10) to facilitate transfer of the main fluid from the rear end 164 of a selected number of fluid flow passages 158 to the main fluid outlet 134 at a time. The inlet and outlet manifolds 176, 178 may be formed in the front and rear caps 229, 230 and/or in one or more face seals.

Referring now to FIGS. 7 to 10, the rotary fluid filter 100 may include at least one sealing member or surface at one or both of the axially forward end 106 or the axially rearward end 108. The sealing member or surface may be operable to contain fluid in a passage 158 of the filter body 150 until the passage 158 is aligned with an inlet or outlet or manifold. The sealing member or surface may be operable to fluidly isolate inlets, outlets, and/or manifolds from one another.

The rotary fluid filter 100 may include a front face seal 224 and a rear face seal 226. Each of front and rear face seals 224, 226 may be formed of and/or have a surface covered in a deformable sealing material such as Teflon™, a Teflon™-impregnated material, silicone, rubber, etc. Each of front seal 224 and rear seal 226 includes at least one aperture therethrough for each inlet in the adjacent cap and at least one aperture therethrough for each outlet in the adjacent cap. Each aperture is fluidly separated from each other aperture to assist in fluidly isolating the inlets and outlets from one another.

The rotary fluid filter 100 may also include one or more wipers 180, such as brushes, adjacent an edge of an opening or port into the interior chamber 182 of the housing 102 to facilitate moving the main fluid into the front ends 162. Wipers 180 may facilitate moving debris of the main fluid into the front ends 162. The wipers 180 may be mounted to the front seal 224 to extend into the main inlet manifold 176. As in the illustrated example of FIG. 7, the main inlet manifold 176 may include a plurality of openings or ports to the interior chamber 182 of the housing 102 separated by cross bars 181. The main inlet manifold 176 may include a wiper 180 for each opening or port (e.g., a wiper 180 mounted on each cross bar 181) to brush against the front face 154 of the filter body 150 as the filter body 150 rotates within the chamber 182.

As the filter body 150 is rotated within the housing 102 in the rotation direction 126 through the filtration cycle a main fluid is drawn through the main fluid inlet 112 and a backwash fluid is pumped into the backwash inlet 136. As each fluid flow passage 158 is aligned with a first rotation position 266 (e.g., aligned with the main inlet manifold 176) the main fluid is received from the main fluid inlet 112.

As the filter body 150 continues to rotate in the first rotation direction 126 the fluid flow passage 158 moves from the first rotation position 266 to a second rotation position 268 (e.g., aligned with the main outlet manifold 178). The main fluid passes through the fluid flow passage 158 and is filtered by the filter received in the fluid flow passage. As the fluid flow passage 158 is aligned with the second rotation position 268, the main fluid is substantially discharged through the main fluid outlet 134.

As the filter body 150 continues to rotate in the first rotation direction 126, the fluid flow passage 158 is aligned with the fourth rotation position 272 (e.g., aligned with the backwash inlet 136 and backwash outlet 114) and backwash fluid is received from the backwash inlet 136 and is discharged through the backwash outlet 114.

As the filter body 150 is rotated from being aligned with the second rotation position 268 to being aligned with the fourth rotation position 272 the fluid flow passage 158 is aligned with a third rotation position 270 (e.g., aligned with the air inlet 128 and air outlet 146) and air is received from the air inlet 128 and is discharged through the air outlet 146. The air received from the air inlet 128 and discharged through the air outlet 146 passes through the fluid flow passage 158 to dry the at least one filter received in the fluid flow passage 158.

Referring now to FIG. 11, filter body 150 supports a plurality of filters 194, with at least one filter 194 received in each fluid flow passage 158. Each filter 194 may include granular filter media (e.g., a bed of granular filter media such as sand or activated carbon or charcoal). Alternatively or additionally, each filter 194 may include a non-granular filter. For example, a filter 194 may be or include a membrane filter, such as an osmosis filter.

As in the illustrated example, the filter body 150 comprises a filter support 151 made up of a plurality of axially aligned filter support layers 218. The filter support layers 218 may be spaced by filter support spacer gaskets 220. The plurality of axially aligned filter support layers 218 may each include a plurality of cartridge holders 222. Each cartridge holder 222 is able to releasably hold a filter cartridge 216.

As in the illustrated example, each cartridge holder 222 may be a cutout or aperture through the filter support layer 218 into which the filter cartridge 216 may be placed. Similarly, each filter support spacer gasket 220 may have a cutout or aperture through the gasket 220 into which the filter cartridge 216 may be placed. The filter cartridge 216 may include a flange sized to prevent the filter cartridge 216 from being passed all the way through the aperture of the filter support layer 218. The aperture through the gasket 220 may be larger than the aperture through the filter support layer 218 such that a flange of the filter 194 may rest in the aperture through the gasket 220 while a pocket of the filter 194 rests in the aperture through the filter support layer 218, as described further below.

The filter cartridges 216 may be aligned, and the fluid flow passages 158 may each extend through a plurality of aligned filter cartridges 216. The plurality of axially aligned filter support layers 218 are separable to provide access to the plurality of aligned removable filter cartridges 216. A user may separate the plurality of axially aligned filter support layers 218 to access one or more filter cartridge 216.

The filter cartridges 216 can be removed from a rearward end of the filter support layer 218. Accordingly, when the filter support layers 218 are held adjacent one another and axially aligned, the filter cartridges 216 of each filter support layer 218 may be held in the filter support layer 218 by the rearward following filter support layer 218. A rear end layer 274 is configured to prevent the filter cartridges 216 of the final filter support layer 218 from being removed when the rear end layer 274 is held adjacent the preceding filter support layer 218. As in the illustrated example, the rear end layer 274 may be a disk having a set of holes 276 (i.e., second end opening or port 168) to be aligned with each fluid flow passage 158. Each set of holes 276 can be axially aligned with a cartridge holder 222 (i.e., cutouts) of the adjacent filter support layer 218.

Each annular wall portion 231 may correspond to a filter support layer 218, and may be spaced from the filter support layer 218 by a radial spacing. Filter support layers 218 may be held to one another by mechanical fasteners, such as screws passed through mounting projections 233 on the filter support layers 218.

Figure 12:
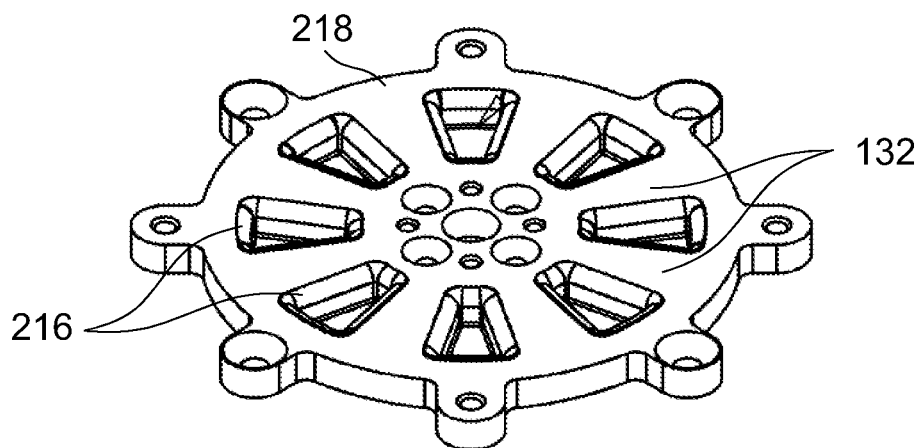
FIG. 12 is a front perspective view of a filter support layer of a filter support of the rotary fluid filter of FIG. 1.
Figure 13:
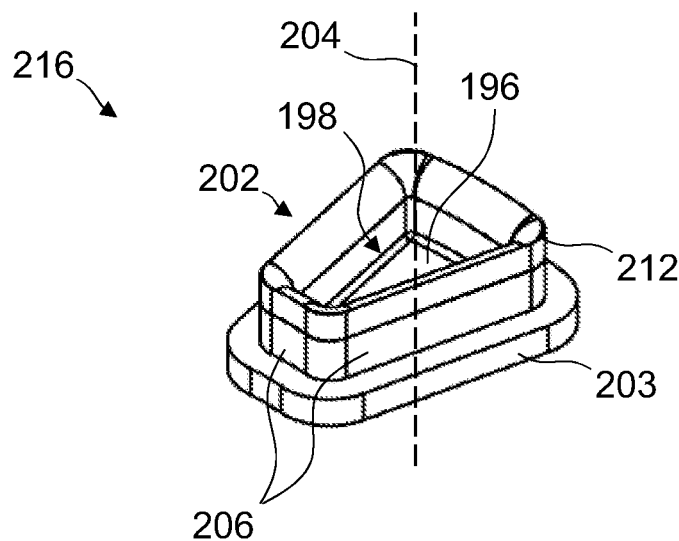
FIG. 13 is a perspective view of a pocket of the rotary fluid filter of FIG. 1.
Figure 14:
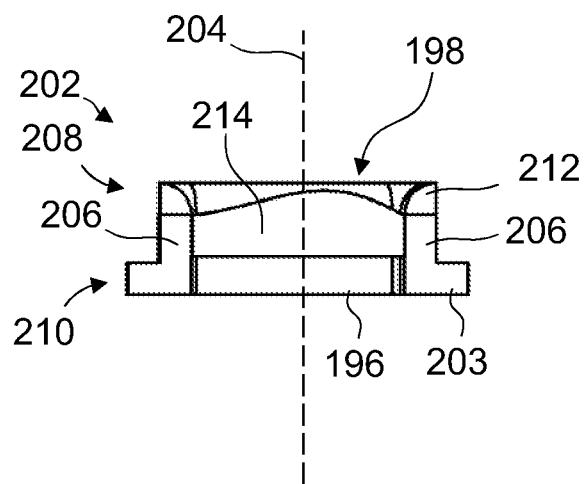
FIG. 14 is a cross sectional view of the pocket of FIG. 13.

Referring now to FIGS. 12 to 14, each filter support layer 218 includes a plurality of removable filter cartridges 216 separated by solid portions 132. Filter cartridges can be removed from the filter support layer 218, such as to replace or service the filter cartridge.

As in the illustrated example, the rotary fluid filter 100 may have eight fluid flow passages 158 separated by 45 degrees. However, the rotary fluid filter 100 may also have a different number of fluid flow passages 158, such as four passages 90 degrees apart or six passages 60 degrees apart. A larger rotary fluid filter 100 may have a greater number of fluid flow passages 158 than a smaller rotary fluid filter 100. For example, a large rotary fluid filter 100 may have twelve fluid flow passages 30 degrees apart or sixteen fluid flow passages 22.5 degrees apart.

Each filter cartridge 216 (FIG. 13) includes a pocket 202 and a flange 203. Flange 203 is shaped to be larger than the aperture through the filter support 218 of each cartridge holder 222 to prevent the filter cartridge from being passed through the filter support layer 218. Accordingly, if the filter cartridge 216 is placed in the filter support layer 218 from the rearward end, it can only be removed from the rearward end. Each pocket 202 includes a flow axis 204 extending between an encircling set of side walls 206. Each pocket 202 has at least one porous end wall 196 extending across the flow axis 204 to inhibit the movement of granular material along the flow axis 204. As in the illustrated example, each pocket 202 may have an open end 208 and a closed end 210 closed by the porous end wall 196. The porous end wall 196 may be made of, for example, a sintered bronze or glass that is porous to the main fluid (e.g., water) but not to the granular filter media (e.g., sand).

A bed of granular filter media 214 may, optionally, be received in the pocket 202. Accordingly, the filter 194 may include a bed of granular filter media 214. The bed of granular filter media 214 may be held by the set of side walls 206, the at least one porous end wall 196, and an at least one porous end wall 196 of another pocket 202. A sealing lip 212 may be formed on the open end 208 of each pocket 202 to facilitate sealing the open end 208 against another surface, such as the end wall 196 of another pocket 202.

The bed of granular filter media 214 may be sized to incompletely fill the pocket 202, such as to leave a portion of the pocket 202 empty. The empty portion of the pocket 202 may facilitate stirring up the bed of granular filter media, as described below. For example, the empty portion of the pocket may be at least ¼ of the internal volume of the pocket 202.

The bed of granular filter media 214 may have a predetermined thickness along the flow axis 204 when gathered at the closed end 210. The size of the predetermined thickness may depend on the size of the rotary fluid filter. For example, the predetermined thickness may be ¼ inch for a small, portable rotary fluid filter or 3 feet for a large, industrial rotary fluid filter.

Figure 15:
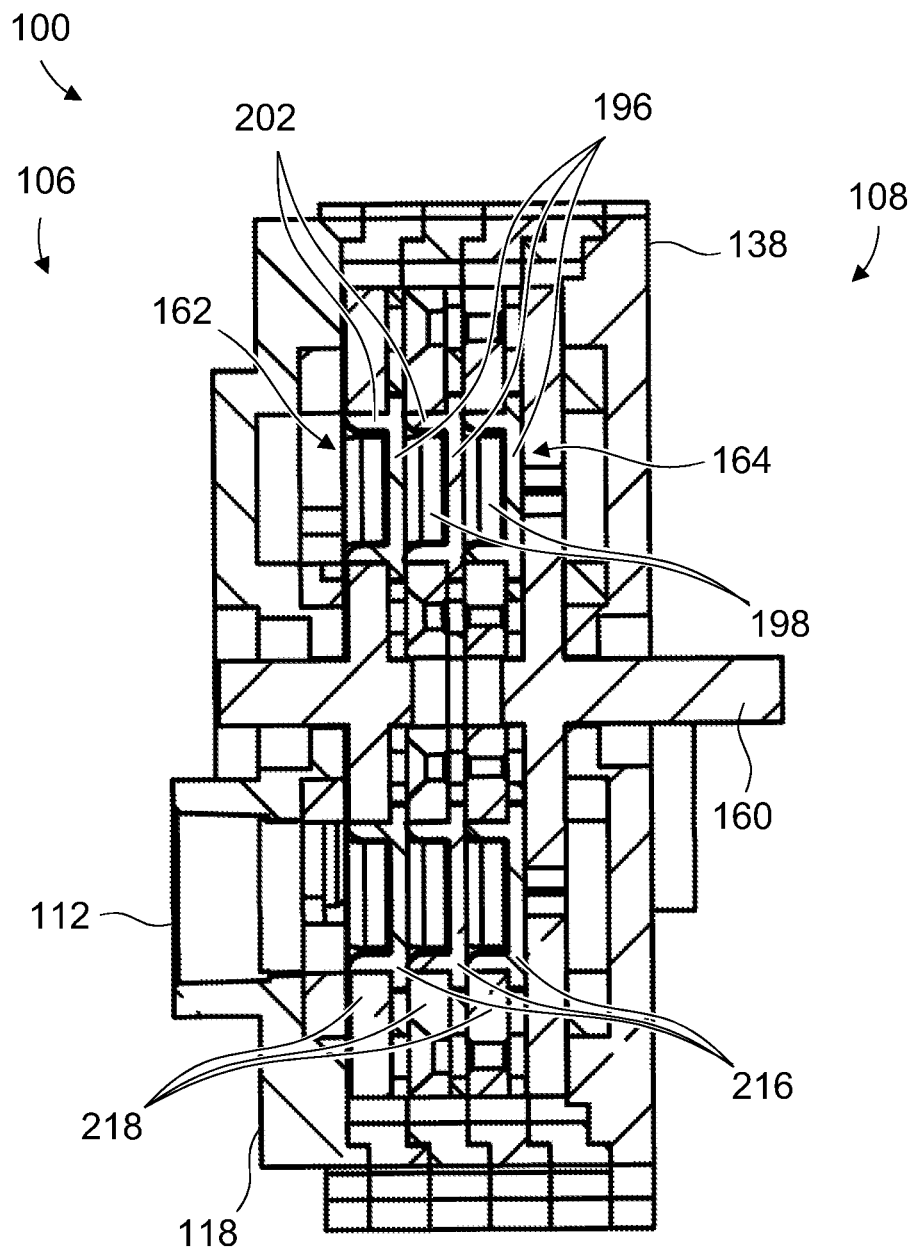
FIG. 15 is a cross sectional view of the rotary fluid filter of FIG. 1, taken along line 15-15 of FIG. 3.

Referring now to FIG. 15, showing a cross section of the rotary fluid filter 100, a first pocket 202 at a front end 162 of each fluid flow passage 158 may be an empty pocket without a bed of granular filter media 214. The first pocket may be open towards the axially forward end 106, such as having the open end 208 directed towards the axially forward end 106. An empty and open pocket at the front end may facilitate filtration, as the empty and open pocket may collect larger debris of the main fluid, such as larger grains or other debris (e.g., swept in by wipers 180).

As in the illustrated example, an axially aligned set of pockets 202 in a fluid flow passage 158 may include a first pocket at the front end 162 with an open end 208 directed towards the axially forward end 106 and one or more further pockets 202 with open ends 208 directed towards the axially forward end 106. The first pocket may be provided as an empty pocket and each of the further pockets may include a bed of loose granular filter media. Accordingly, the beds of loose granular filter media of the further pockets may be held by the set of side walls 206, the porous end wall 196, and the porous end wall of the preceding pocket 202 in the axially forward direction. Each subsequent bed of loose granular filter media in the fluid flow passage 158 from the front end 162 to the rear end 164 may include granular filter media that is finer than the preceding bed to filter out smaller contaminants.

Accordingly, for each fluid flow passage 158 of the plurality of fluid flow passages 158 at least two porous walls 196 may extend across the fluid flow passage 158 to define at least one media chamber 198 therebetween to hold the bed of loose granular filter media of at least one filter 194 in the fluid flow passage 158.

For each fluid flow passage 158 of the plurality of fluid flow passages 158 the backwash fluid may be received from the backwash inlet 136 unevenly across the rear end 164 and/or at a high velocity. Accordingly, the at least one filter 194 received in the fluid flow passage 158 may be stirred up by the backwash fluid.

Referring again to FIG. 11, as in the illustrated example, the backwash inlet 136 may include a cross-sectionally constrained portion to direct the flow of the backwash fluid at one or more sub portions of the rear end 164 of an aligned fluid flow passage 158. In the illustrated example, the backwash inlet 136 includes a slot-shaped inlet 228 (see also FIG. 9). Accordingly, the backwash fluid may enter the rear end 164 of the aligned fluid flow passage 158 as a blade-shaped jet of fluid.

In use, the rotary fluid filter 100 may be used to filter a main fluid such as water. As illustrated, the filter body 150 of the rotary fluid filter may have eight linear fluid flow passages 158 spaced 45 degrees apart. The filter body 150 may be continuously rotated within the housing 102 (i.e., repeatedly undergoing 360 degree filtration cycles in the first rotational direction 126).

In use, as the filter body 150 is continuously rotated in the housing 102 each fluid flow passage 158 is sequentially aligned with one of the first, second, third, or fourth rotation positions 266, 268, 270, 272 (See FIGS. 3 and 4) of the housing 102 during the filtration cycle, and that fluid flow passage 158 receives and/or discharges the appropriate fluid (i.e., the main fluid, the air, or the backwash fluid). More specifically, as the front end 162 of each fluid flow passage 158 is aligned with the first rotation position 266 (i.e., as the front end 162 passes the main inlet manifold 176) dirty fluid (i.e., main fluid, e.g., dirty water) is drawn into the fluid flow passage from the main fluid inlet 112 by at least one pump in fluid communication with the rotary fluid filter 100. A filter 194 is received in each fluid flow passage 158, and the dirty fluid passes through the filter 194 as it moves from the front end 162 to the rear end 164. As the rear end 164 of the fluid flow passage 158 is aligned with the second rotation position 268 (i.e., as the rear end 164 passes the main outlet manifold 178) the now-filtered fluid (e.g., filtered water) is drawn from the fluid flow passage into the main fluid outlet 136 by the at least one pump in fluid communication with the rotary fluid filter 100. Each of the main inlet manifold 176 and main outlet manifold 178 extend over a sufficient angular extent to be fluidly coupled with a plurality of fluid flow passages 158 at a time (e.g., four as in the illustrated example).

As the filter body 150 continues to rotate in the first rotational direction 126, the fluid flow passage 158 moves past the main outlet manifold 178 and to the third rotation position 170. At the third rotation position 170 the fluid flow passage 158 passes and is aligned with the air inlet 128 and the air outlet 146, and the at least one pump in fluid communication with the rotary fluid filter 100 draws air through the air inlet 128, the aligned fluid flow passage 158, and the air outlet 146 to dry the filter 194. As the filter body 150 continues to rotate in the first rotational direction 126 the fluid flow passage 158 moves past the third rotation position 170 and to the fourth rotational position 172. At the fourth rotational position 172 the fluid flow passage 158 passes and is aligned with the backwash inlet 136 and the backwash outlet 114, and the at least one pump in fluid communication with the rotary fluid filter 100 pumps the backwash fluid through the backwash inlet 136, the fluid flow passage 158, and the backwash outlet 114 to flush out the filter 194.

In use, the filter body 150 is continuously rotated in the first rotational direction 126, and at least one fluid flow passage 158 of the eight fluid flow passages 158 is substantially aligned with each of the first, second, third, or fourth rotation positions 266, 268, 270, 272 of the housing 102 at all times. Accordingly, the rotary fluid filter 100 may substantially continuously filter the main fluid, and each filters 194 is dried and then backwashed between each use.

Figure 16:
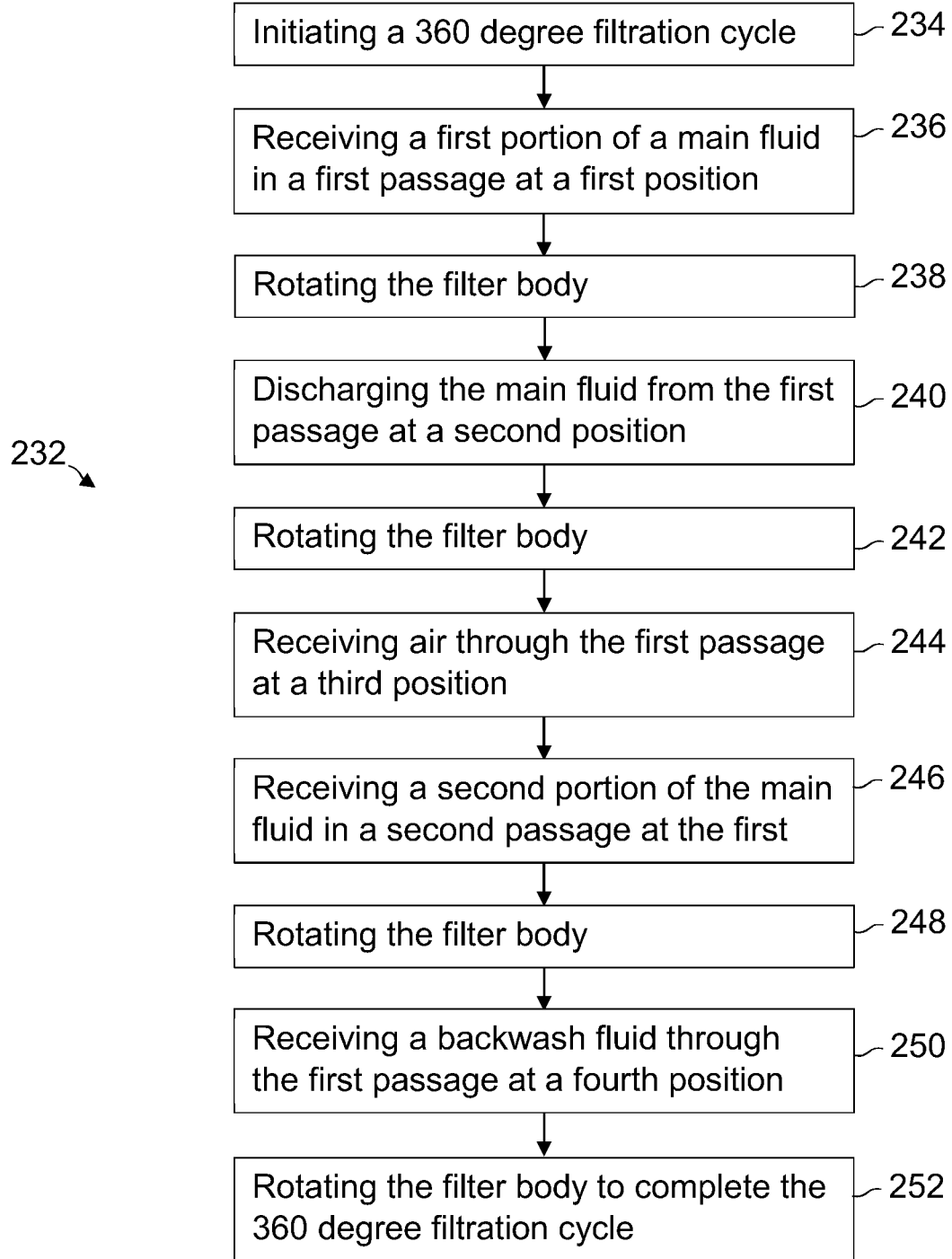
FIG. 16 is a flow chart of a method of filtering a main fluid using a rotary fluid filter.

Referring now to FIG. 16, a method 232 of filtering the main fluid using the rotary fluid filter 100 includes initiating, at step 234, a 360 degree filtration cycle. The filtration cycle begins with, at step 236, a first portion of a main fluid being received at the front end 162 of a first fluid flow passage extending through the rotationally mounted filter body 150, with the first fluid flow passage aligned with the first rotation position 266 of the housing 102.

The method 232 also includes rotating, at step 238, the filter body 150 in the first rotation direction 126 to align the first fluid flow passage 158 with a second rotation position 268 of the housing 102. At step 240, the first portion of the main fluid is discharged from the rear end 164 of the first fluid flow passage, while the first fluid flow passage 158 is aligned with the second rotation position 268 of the housing 102. The discharged first portion of the main fluid having passed through a filter 194 received in the first fluid flow passage.

At step 242 the filter body 150 is rotated in the first rotation direction 126 about the rotational axis A to align the first fluid flow passage with a third rotation position 270. At step 244, subsequent to step 242, a first portion of air is received through the first fluid flow passage 158. The first portion of air passes through the filter 194 received in the first fluid flow passage to dry the filter 194.

After receiving the first portion of air through the first fluid flow passage, the filter body 150 is rotated, at step 248, in the first rotation direction 126 to align the first fluid flow passage with the fourth rotation position 272. At step 250, subsequent to step 244, a first portion of a backwash fluid is received through the first fluid flow passage 158 from the rear end 164 to the front end 162. As it is received through the first fluid flow passage, the first portion of the backwash fluid passes through the filter 194 received in the first fluid flow passage to regenerate the filter 194. For example, the first portion of the backwash fluid may stir up a bed of granular material and/or flush contaminants out of a filter and back out of the front end 162 of the first fluid flow passage 158.

In some examples, the contaminants filtered out of the main fluid may be collected for use. For example, the rotary fluid filter 100 may be used to filter a machine shop cooling fluid, which may contain valuable metal shavings. In another example, the rotary fluid filter 100 may be used to filter a discharge from a gold mine, which may contain valuable gold dust.

At step 252, the filtration cycle is completed by rotating, after the first portion of the backwash fluid is discharged from the front end 162 of the first fluid flow passage, the filter body 150 in the first rotation direction 126 to once again align the first fluid flow passage with the first rotation position 266.

The rotary fluid filter 100 includes a plurality of fluid flow passages 158 and may filter the main fluid substantially continuously. Specifically, at least one fluid flow passage 158 may be available for and/or involved in the filtration of a portion of the main fluid at each position of the filter body 150 along the rotational path 130. For example, a second fluid flow passage of the filter body 150 is separate from the first fluid flow passage 158. The method 232 further comprises, between step 238 and step 252, receiving, at step 246, a second portion of the main fluid at the front end 162 of the second fluid flow passage 158. The second portion of the main fluid may then pass through the second fluid flow passage as the filter body 150 continues to rotate.

As discussed elsewhere herein, the filter body 150 may be rotationally mounted in the housing 102 of the rotary fluid filter 100. The housing 102 may have the main fluid inlet 112 formed therein, and the first portion of the main fluid may be received at the front end 162 of the first fluid flow passage 158 from the main fluid inlet 112. The second portion of the main fluid may also be received at the front end 162 of the second fluid flow passage 158 from the main fluid inlet 112. Accordingly, the first and second fluid flow passages may receive the main fluid sequentially and when aligned with the first position 266.

Figure 17:
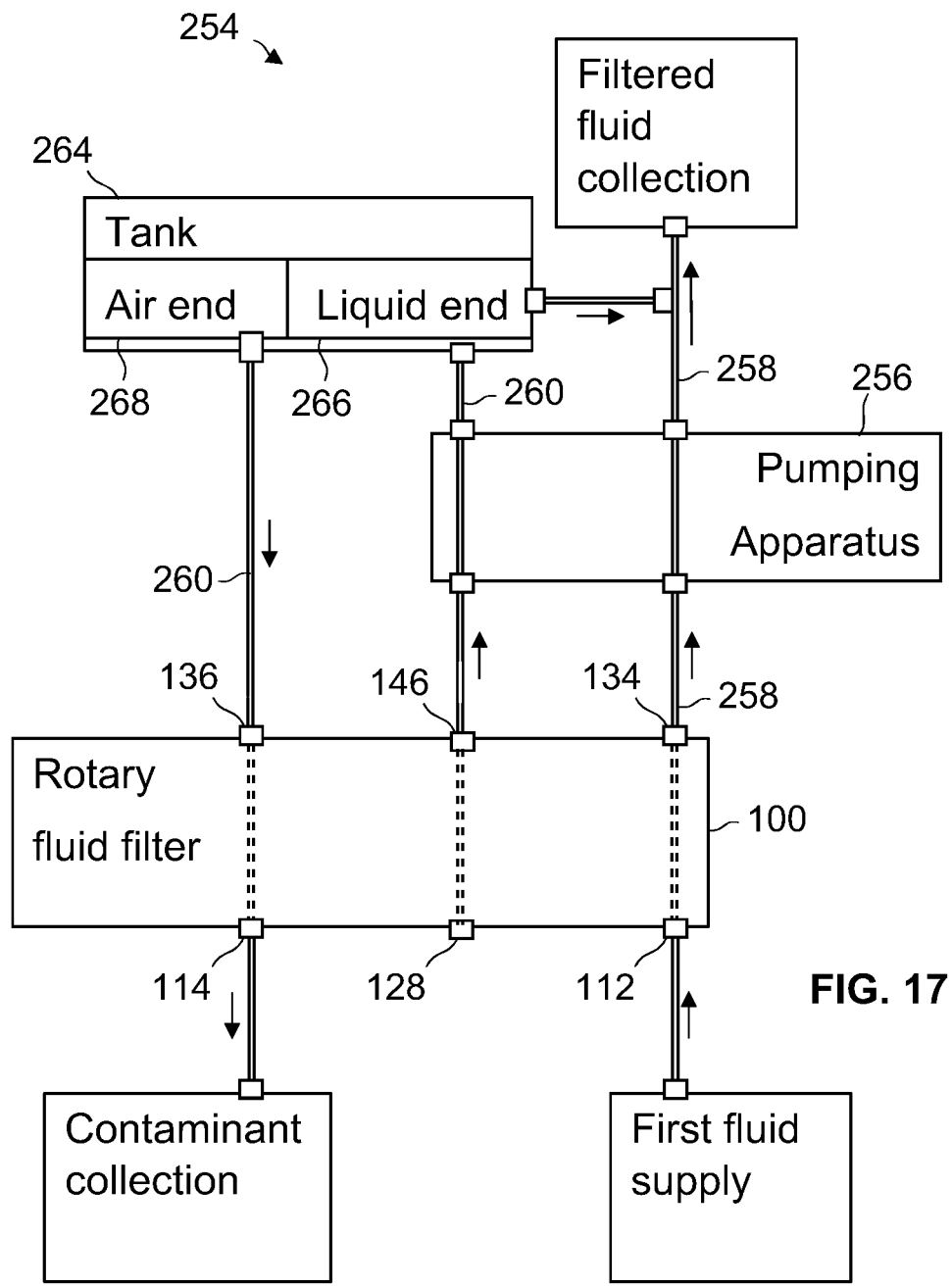
FIG. 17 is a schematic diagram of a fluid pumping system.

Referring now to FIG. 17, the rotary fluid filter 100 may be a part of a fluid pumping system 254. The fluid pumping system 254 includes the rotary fluid filter 100 and a pumping apparatus 256.

The pumping apparatus 256 may be operable to simultaneously pump a main fluid through a first pump conduit 258 and a backwash fluid through a second pump conduit 260. For example, the pumping apparatus 256 may have at least two independent fluid circuits.

In some examples, the pumping apparatus 256 is a rotary pump. An example of a rotary pump operable to simultaneously pump a main fluid through a first pump conduit 258 and a backwash fluid through a second pump conduit 260 is disclosed in U.S. Pat. No. 8,985,980 to Patterson et al., which is hereby incorporated by reference in its entirety. The rotary pump and the rotary fluid filter may be operated at the same revolutions per minute or at different revolutions per minute. For example, the rotary pump may operate at ten or more times the number of revolutions per minute of the rotary fluid filter, or at 100 or more times the number of revolutions per minute of the rotary fluid filter. The revolutions per minute of one or both of the rotary pump and the rotary fluid filter can be adjusted as needed to adjust the level of filtration.

As in the illustrated example, the first pump conduit 258 may be fluidly coupled to one of the main fluid inlet 112 or the main fluid outlet 134 for the main fluid to be pumped therethrough. The second pump conduit 260 may be fluidly coupled to one of the backwash inlet 136 and the backwash outlet 114 for the backwash fluid to be pumped therethrough.

As in the illustrated example, the first pump conduit 258 may be fluidly coupled to the main fluid outlet 134 to draw the main fluid through the rotary fluid filter 100 by vacuum pressure, and the second pump conduit 260 may be fluidly coupled to the backwash inlet 136 to drive the backwash fluid into the rotary fluid filter 100. Further as in the illustrated example, the pumping apparatus 256 may be fluidly coupled to the air outlet 146 to draw the air from the air outlet 146 for use as the backwash fluid.

In the illustrated example, the air is directed to a separating tank 264, in which entrained main fluid is separated from the air and redirected back to the output of the main fluid outlet 134. The air is then used as the backwash fluid, and redirected back to the backwash inlet 136. The separation tank may be, for example, a compressed tank, and the main fluid may settle out at one end 266. The main fluid 266 may then be directed out of the separation tank 264 and back to be added to the output of the main fluid outlet 134, while the air is directed from the other end 268 to the backwash inlet 136.

Filtered fluid, such as the main fluid output, may be pumped into a storage location or used immediately. Similarly, output from the backwash outlet 114 may be stored or used.

The present invention has been described here by way of example only. Various modification and variations may be made to these examples without departing from the scope of the invention, which is limited only by the appended claims.

The invention claimed is:

1. A rotary fluid filter, comprising:
  a housing comprising:
    a front cap having a main fluid inlet located at a first rotation position and a backwash outlet located at a fourth rotation position,
    a rear cap having a main fluid outlet located at a second rotation position and a backwash inlet located at the fourth rotation position, the main fluid inlet, backwash outlet, main fluid outlet and backwash inlet being spaced at a first radial distance from a rotational axis, and
    a side wall connecting the front cap to the rear cap; and
  a filter body rotationally mounted within the housing for rotation about a rotational axis, the filter body operable to be rotated in a rotation direction within the housing through a 360 degree filtration cycle, the filter body comprising:
    a filter support having a front face and a rear face opposite the front face, the filter support being configured to have a plurality of discrete fluid flow passages each extending between a first end at the first radial distance from the rotational axis in the front face and a second end at the first radial distance from the rotational axis in the rear face,
    a plurality of filters supported by the filter support, at least one filter of the plurality of filters received in each fluid flow passage of the plurality of fluid flow passages;
    wherein the second rotation position is spaced from the first rotation position by a first angular spacing about the rotational axis in the rotation direction, and the fourth rotation position is spaced from the second rotation position by a second angular spacing about the rotational axis in the rotation direction, the sum of the first angular spacing and the second angular spacing being less than 360 degrees.

2. The rotary fluid filter of claim 1, wherein the plurality of filters includes a plurality of beds of granular filter media.

3. The rotary fluid filter of claim 2, wherein for each fluid flow passage of the plurality of fluid flow passages a backwash fluid is received from the backwash inlet unevenly across a rear end to stir up the at least one filter.

4. The rotary fluid filter of claim 3, wherein the backwash inlet includes a slot-shaped inlet.

5. The rotary fluid filter of claim 1, wherein for each fluid flow passage of the plurality of fluid flow passages at least two porous walls extend across the fluid flow passage to define at least one media chamber therebetween to hold the at least one filter in the fluid flow passage, the at least one filter including a bed of loose granular filter media.

6. The rotary fluid filter of claim 5, wherein the bed of loose granular filter media includes sand.

7. The rotary fluid filter of claim 1, wherein each fluid flow passage of the plurality of fluid flow passages extends through a plurality of aligned removable filter cartridges.

8. The rotary fluid filter of claim 7, wherein each filter cartridge of the plurality of aligned removable filter cartridges includes a pocket having a flow axis extending between a set of side walls and having at least one porous end wall extending across the flow axis to inhibit the movement of granular material along the flow axis.

9. The rotary fluid filter of claim 8, wherein the pocket of the filter cartridge of the plurality of aligned removable filter cartridges at a front end is provided as an empty pocket and the pocket of each other of the plurality of aligned removable filter cartridges includes a bed of loose granular filter media.

10. The rotary fluid filter of claim 7, wherein the filter body is formed of a plurality of axially aligned filter support layers, and each filter cartridge of the plurality of aligned removable filter cartridges is removably held by a cartridge holder included in a filter support layer of the plurality of axially aligned filter support layers, and wherein the plurality of axially aligned filter support layers are separable to provide access to the plurality of aligned removable filter cartridges.

11. The rotary fluid filter of claim 1, wherein:
the front cap includes an air inlet at a third rotation position and the rear cap includes an air outlet at the third rotation position,
the third rotation position is spaced the first radial distance from the rotational axis and is spaced from the second rotation position by a third angular spacing about the rotational axis in the rotation direction, the third angular spacing being less than the second angular spacing.

12. The rotary fluid filter of claim 11, wherein:
the plurality of fluid flow passages are evenly angularly spaced about the rotational axis.

13. The rotary fluid filter of claim 1, wherein each fluid flow passage is a linear passage.

14. The rotary fluid filter of claim 1, wherein as the filter body is rotated within the housing in the rotation direction through the filtration cycle and a main fluid is drawn through the main fluid inlet and a backwash fluid is pumped into the backwash inlet, for each fluid flow passage:
as the fluid flow passage is aligned with the first rotation position, the main fluid is received from the main fluid inlet,
as the filter body continues to rotate in the first rotation direction, the fluid flow passage moves from the first rotation position to the second rotation position, the main fluid passes through the fluid flow passage and is filtered by the filter received in the fluid flow passage, and as the fluid flow passage is aligned with the second rotation position, the fluid is substantially discharged through the main fluid outlet, and
as the filter body continues to rotate in the first rotation direction, the fluid flow passage is aligned with the fourth rotation position and backwash fluid is received from the backwash inlet and is discharged through the backwash outlet.

15. The rotary fluid filter of claim 14, wherein:
the front cap includes an air inlet at a third rotation position and the rear cap includes an air outlet at the third rotation position,
the third rotation position is spaced the first radial distance from the rotational axis and is spaced from the second rotation position by a third angular spacing about the rotational axis in the rotation direction, the third angular spacing being less than the second angular spacing, and
as the filter body is rotated within the housing in the rotation direction through the filtration cycle and the main fluid is drawn through the main fluid inlet and the backwash fluid is pumped into the backwash fluid inlet, for each fluid flow passage:
as the filter body continues to rotate from being aligned with the second rotation position to being aligned with the fourth rotation position the fluid flow passage is aligned with the third rotation position and air is received from the air inlet and is discharged through the air outlet.

16. A fluid pumping system, comprising:
the rotary fluid filter of claim 1; and
a pumping apparatus operable to simultaneously pump a main fluid through a first pump conduit and a backwash fluid through a second pump conduit, the first pump conduit fluidly coupled to one of the main fluid inlet or the main fluid outlet for the main fluid to be pumped therethrough, and the second pump conduit fluidly coupled to one of the backwash inlet and the backwash outlet for the backwash fluid to be pumped therethrough.

17. The fluid pumping system of claim 16, wherein the pumping apparatus is a rotary pump.

18. The fluid pumping system of claim 16, wherein the front cap includes an air inlet at a third rotation position and the rear cap includes an air outlet at the third rotation position.

19. The rotary fluid filter of claim 14, wherein the main fluid comprises water and the backwash fluid comprises a gas.

* * * * *